United States Patent
Dahiya

(10) Patent No.: US 7,640,332 B2
(45) Date of Patent: Dec. 29, 2009

(54) SYSTEM AND METHOD FOR HOT DEPLOYMENT/REDEPLOYMENT IN GRID COMPUTING ENVIRONMENT

(75) Inventor: Sanjay Dahiya, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 256 days.

(21) Appl. No.: 12/003,182

(22) Filed: Dec. 20, 2007

(65) Prior Publication Data

US 2008/0162674 A1  Jul. 3, 2008

(30) Foreign Application Priority Data

Dec. 27, 2006 (IN) .................... 2428/CHE/2006

(51) Int. Cl.
*G06F 15/173* (2006.01)
*G06F 9/445* (2006.01)
(52) U.S. Cl. .................................. 709/223; 717/176
(58) Field of Classification Search ................ 709/223; 717/176
See application file for complete search history.

(56) References Cited

U.S. PATENT DOCUMENTS

| 7,305,585 B2* | 12/2007 | Marchand ............... 714/18 |
| 2005/0120353 A1* | 6/2005 | Zhang et al. ............ 719/310 |
| 2005/0138618 A1* | 6/2005 | Gebhart ................. 717/176 |
| 2006/0005181 A1* | 1/2006 | Fellenstein et al. ....... 717/174 |
| 2006/0195688 A1* | 8/2006 | Drissi et al. ............ 713/152 |
| 2007/0028098 A1* | 2/2007 | Baartman et al. ......... 713/162 |
| 2007/0106773 A1* | 5/2007 | Gallino et al. .......... 709/223 |
| 2007/0233827 A1* | 10/2007 | McKnight .............. 709/223 |
| 2008/0123559 A1* | 5/2008 | Haviv et al. ............ 370/255 |

* cited by examiner

*Primary Examiner*—Kenny S Lin

(57) ABSTRACT

A technique for hot deploying/redeploying applications in a grid computing environment to improve operating efficiency and reduced overhead. In one example embodiment, this is accomplished by notifying a client application manager associated with each of one or more grid nodes about a type of data transfer protocol to use upon receiving a new version of an application release bundle by a repository server. The new version of the application release bundle is then hot deployed/ redeployed on running one or more application servers in the associated grid using an appropriate hot deployment plug-in based on the data transfer protocol by each client application manager.

18 Claims, 3 Drawing Sheets

SYSTEM AND METHOD FOR HOT DEPLOYMENT/REDEPLOYMENT IN GRID COMPUTING ENVIRONMENT

This application claims priority from Indian patent application 2428/CHE/2006, filed on Dec. 27, 2006. The entire content of the aforementioned application is incorporated herein by reference.

BACKGROUND OF THE INVENTION

Grid computing is touted as one of the most important and promising paradigms for applications that require long computing times or large storage spaces. It is attracting a growing number of users to develop larger scale distributed software applications than ever before. In general, grid computing enables resource virtualization, on-demand provisioning, and service (resource) sharing between organizations. In summary, grid computing provides the ability to use a set of open standards and protocols, to gain access to applications and data, processing power, storage capacity and a vast array of other computing resources over the Internet. It is a type of parallel and distributed system that enables the sharing, selection, and aggregation of resources distributed across multiple administrative domains based on the resources availability, capacity, performance, cost and users' quality-of-service requirements.

In recent years, grid computing with web services for components oriented systems, such as J2EE based applications is gaining popularity. The J2EE based applications are built as a set of components. Generally, these components are hosted by a container or a server, which provides an execution environment to the components. In such a system, multiple applications may be hosted in a single container. In such a scenario, upgrading an application or hot redeployment of an application in a container does not require restarting the container as J2EE based container support hot deployment mechanisms. This is a very desirable feature as it would not impact running of other applications residing in the system. Hot deployment refers to a process of deploying/redeploying an application without having to shutdown/restart an application container. Hot deployment is commonly used in containers that run in standalone mode or homogenous cluster environment where every new application change is propagated to all the servers connected in the environment.

Whereas, in grid computing environments there can be potentially many containers running several applications and different servers can be running different set of applications, i.e., the applications can run in multi-vendor and multi-version application server environments. Such a complexity can create a two fold problem in grid computing environment. The first being that the information about which server is running what application is dynamic and not static. The second being that the application containers may be running on different platforms as described above and can require different data transfer mechanisms for hot deployment/redeployment. This can result in requiring the grid system to be temporarily suspended and reinitialized during the service deployment/redeployment. This can further result in requiring stopping all the running services and applications. This can be a significant overhead on the grid system.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "application server" and "application container" are used interchangeably throughout the document.

The present technique tightly integrates deployment and/or re-deployment system with grid discovery services. Further, the technique provides data transfer services to find the deployed and/or redeployed instances of target applications, move new applications on target nodes and then hot-deploy and re-deploy them.

Figure 1:
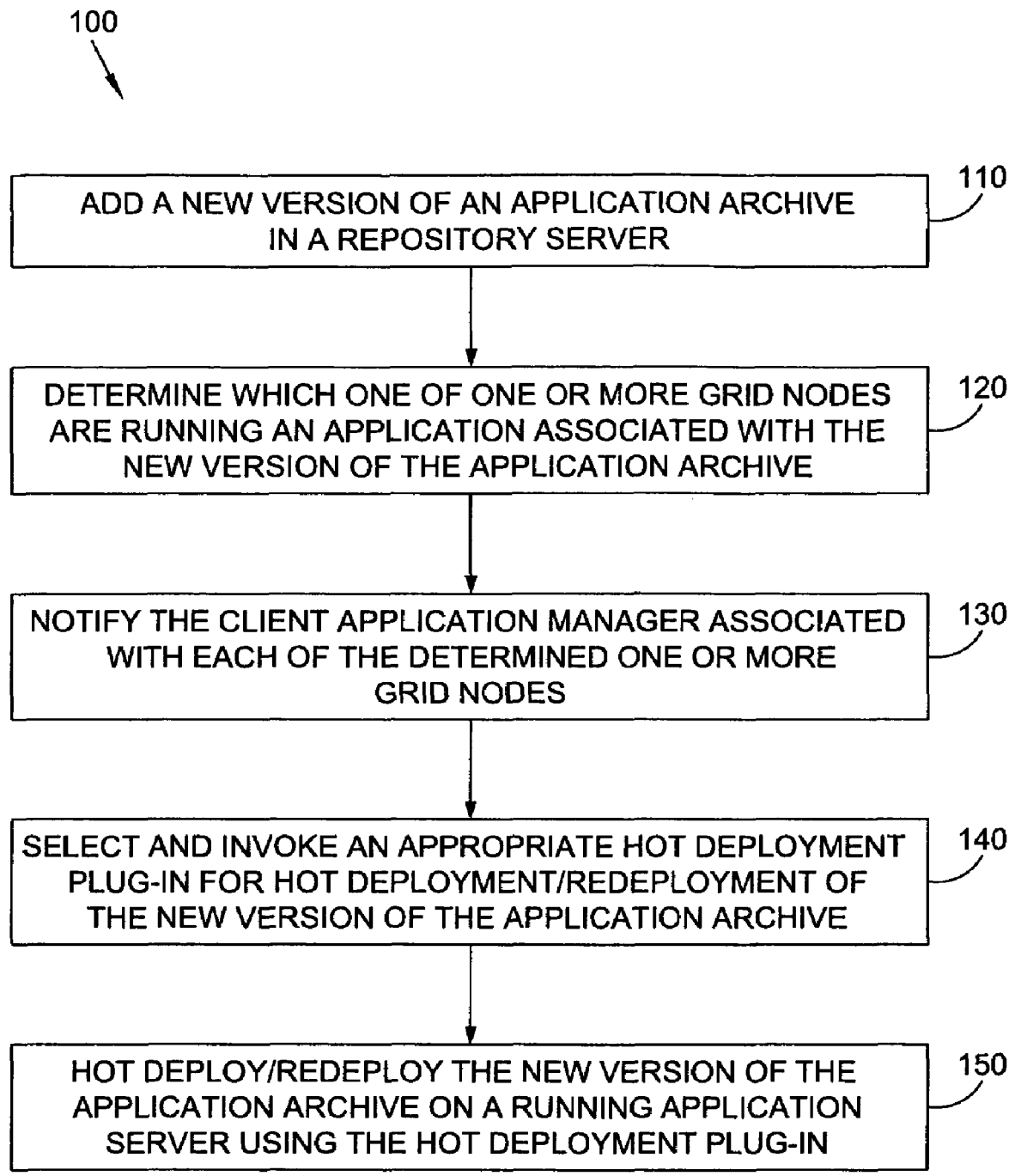
FIG. 1 is a flowchart illustrating a method for hot deployment/redeployment in grid computing environment according to an embodiment of the present subject matter.

FIG. 1 illustrates an example method 100 for hot deployment/redeployment of data in grid computing environment. At step 110, this example method 100 begins by adding a new version of the application release bundle in a repository server. In these embodiments, the repository server contains application release bundles for all versions of an application. These application release bundles are available to all nodes on the grid system. Also in these embodiments, the repository server can support one or more data transfer protocols, such as ftp (file transfer protocol), http (hypertext transfer protocol), gridftp, tcp (transmission control protocol), udp (user datagram protocol) and so on to transfer application release bundles to the associated client nodes. In some embodiments, the grid computing environment can include multiple grid nodes and each node can have hundreds of servers running on heterogeneous platforms. These servers generally run different set of applications at different times. The repository server is kept updated so that the next time when an application is deployed an updated version is chosen from the repository server thereby significantly reducing the chance of deploying an older version of the application. The application release bundle can include application archive code, such as zip, jar, tar, tgz, exe and the like.

At step 120, upon adding the new version of the application release bundle in the repository server, the method 100 determines which one of the one or more grid nodes are running an application associated with the added new version of the application release bundle by a discovery services module. At step 130, a client application manager associated with each of the determined one or more grid nodes notifies the adding of the new version of the application release bundle along with the type of data transfer protocol to use by the repository server. The term client refers to nodes running application servers on each grid node. The grid nodes include one or more application servers that include components, such as Web containers, Web service containers, and EJB container. In these embodiments, the client application manager registers with the repository server and can accept notifications from a server using grid notification mechanisms. The client application manager uses data transfer plug-ins for transferring application release bundles from the repository server to client and hence is extensible to support any data transfer mechanism. In some embodiments, the client application manager associated with each one of the one or more grid nodes registers with the repository server for accepting notification of receiving the new version of the application release bundle.

At step 140, an appropriate hot-deployment plug-in is selected and invoked by each client application manager based on the data transfer protocol to use for hot deploying/redeploying the new version of the application release bundle in an associated grid node. In these embodiments, the application includes a set of components that are hosted by one or more application servers in the one or more grid nodes.

At step 150, the new version of the application release bundle is hot deployed/redeployed on running one or more application servers in the associated grid node using an appropriate hot deployment plug-in based on the data transfer protocol by each client application manager. In some embodiments, the new version of the application release bundle is hot deployed/redeployed on running one or more application servers using the appropriate hot deployment plug-in by a data transfer client associated with each client application manager. In these embodiments, the repository server includes one or more new versions of an application release bundle associated with the application.

Although the flowchart 100 includes steps 110-150 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 2:
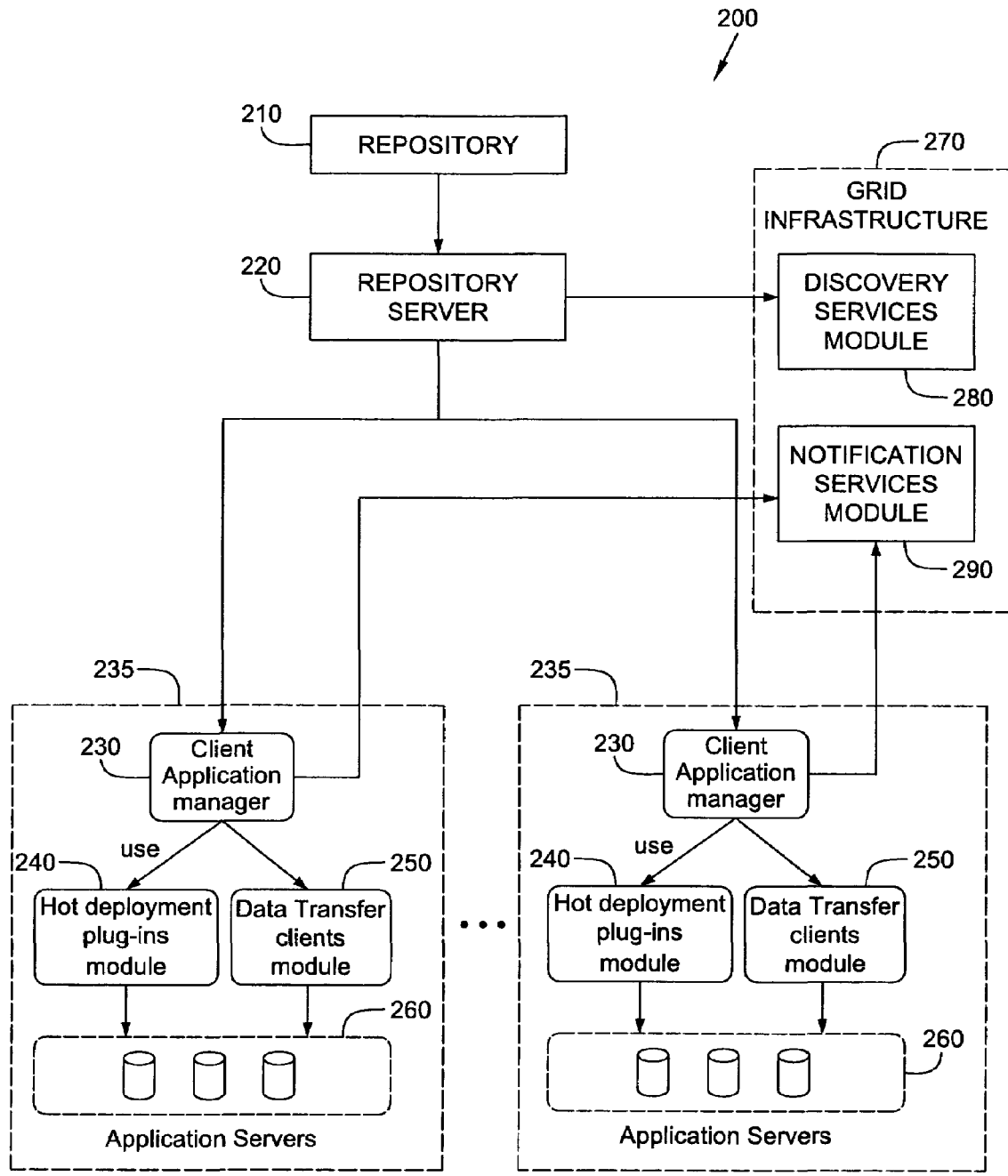
FIG. 2 is a block diagram that shows how the hot deployment system interacts in a grid computing environment according to an embodiment of the present subject matter.

Referring now to FIG. 2, there is illustrated an example block diagram of a hot deployment system 200 and its interactions within a grid computing environment. As shown in FIG. 2, the hot deployment system 200 includes a repository 210, a repository server 220, one or more grid nodes 235 and a grid infrastructure 270. Further as shown in FIG. 2, each grid node 235 includes a client application manager 230, hot deployment plug-ins 240 and data transfer clients 250, and one or more application servers 260 that are associated with each client application manager 230. In these embodiments, one or more deployed applications run on the one or more application servers 260 in each grid node 235. The one or more application servers 260 include components, such as Web containers, Web service container, and EJB container. Furthermore as shown in FIG. 2, the grid infrastructure 270 includes discovery services module 280 and notification services module 290.

In operation, the repository 210 adds a new version of an application release bundle in the repository server 220. Generally in these embodiments, the repository server 220 contains application release bundles for all versions of an application. These application release bundles are available to all grid nodes 235 in the grid computing environment. In these embodiments, the repository server 220 can support one or more data transfer protocols. Exemplary data transfer protocols include ftp, http, gridftp, tcp, and udp.

Upon adding the new version of the application release bundle in the repository server 220 by the repository 210, the discovery services module 280 determines which of the one or more grid nodes 235 are running an application associated with the added new version of the application release bundle. The repository server 220 then notifies the client application manager 230 associated with the determined one or more grid nodes 235 about adding the new version of the application release bundle along with the type of data transfer protocol to use for hot deploying/redeploying the new version of the application release bundle. The term client refers to a node running the one or more application servers 260 in each grid node. In these embodiments, each client application manager 230 registers with the repository server 230 and can accept the notification from the repository server 230 about the adding of a new version of an application release bundle in the repository server 230 via the grid infrastructure 270. The discovery services module 280 includes information related to resources in each grid node 235. The resource information can include protocols, such as G I I S (Grid Information Index Service) and G R I S (Grid Resource Information Service), required to hot deploy/redeploy the new version of the application release bundle for each grid node 235. The discovery services module 280 also includes information relating to each type of data transfer protocol, for example, ftp, http, gridftp, tcp, and udp, required for hot deploying/redeploying. The notification services module 290 includes scheduling information, for example, Meta data relating to scheduling information. In these embodiments, each client application manager 230 obtains the information associated with added new version of the application release bundle and hot deploys/redeploys the new version of the application release bundle in the associated one or more application servers 260 in the associated grid node 235.

In some embodiments, each client application manager 230 hot deploys/redeploys the new version of the application release bundle on one or more running application servers 260 in associated grid node 235 using an appropriate hot deployment plug-in based on using the notified type of data transfer protocol for hot deploying/redeploying. In some embodiments, the client application manager 230 associated with each grid node 235 selects an appropriate hot deployment plug-in needed to hot deploy/redeploy the new version of the application release bundle in the associated one of the one or more application servers 260 using the grid infrastructure 270. In these embodiments, the client application manager 230 selects an appropriate hot deployment plug-in using the discovery services module 280 and hot deploys/redeploys the new version of the application release bundle via the hot deployment plug-ins module 240 on one or more running application servers 260 in each determined grid node 235. The application release bundle includes, for example, a set of components that are hosted by one or more application servers 260 in the one or more grid nodes 235.

The client application manager 230 then invokes the hot deployment plug-ins module 240 along with the data transfer clients module 250 to hot deploy/redeploy the new version of the application release bundle in the associated one or more applications servers 260 in each grid node 235. In these embodiments, the client application manager 230 interacts with the discovery services module 280 to determine which of the one or more grid nodes are running the application associated with the added new version of the application release bundle. The client application manager 230 associated with each grid node 235 hot deploys/redeploys the new version of the application release bundle in the one or more application servers 260 using the hot deployment plug-ins module 240 and the data transfer clients module 250.

The hot deployment/redeployment plug-ins are selected by each client application manager 230 based on system hardware information associated with each of the one or more application servers 260 obtained from the grid infrastructure 270. The hot deployment/redeployment plug-ins can include protocols, such as ftp, http, gridftp, tcp, and udp. These hot deployment/redeployment plug-ins facilitate in hot deploying/redeploying the added new version of the application release bundle on running one or more applications servers 260. In these embodiments, the hot deployment/redeployment plug-ins are used for data transfer associated with the added new version of the application release bundle. Also in these embodiments, the client application manager 230 uses the data transfer clients module 250 via the hot deployment plug-ins module 240 to transfer data associated with added new version of the application release bundle.

Various embodiments of the present subject matter can be implemented in software, which may be run in the computing system environment 300 shown in FIG. 3 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 3:
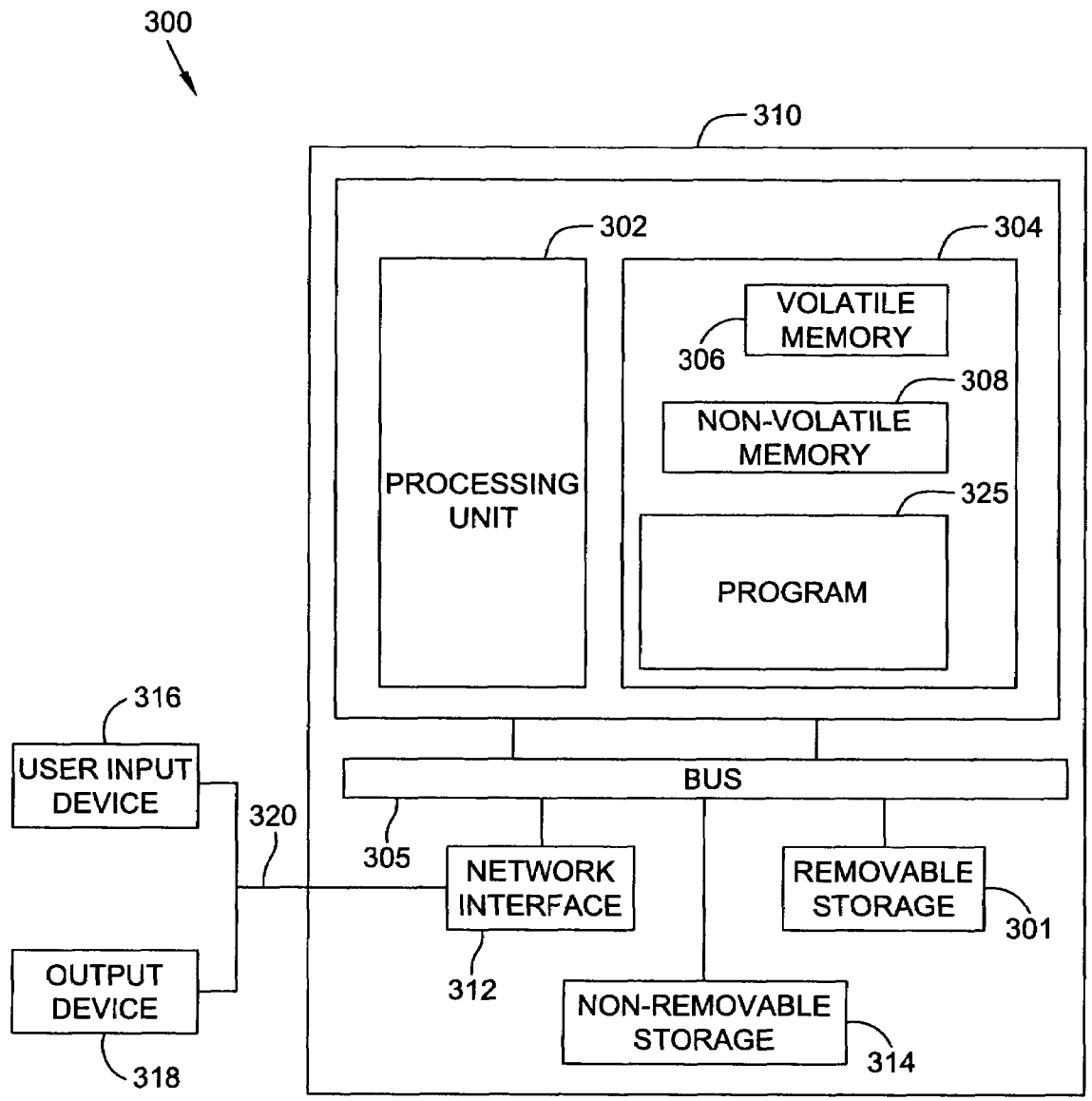
FIG. 3 is a block diagram of a typical computer system used for implementing embodiments of the present subject matter shown in FIGS. 1-2.

FIG. 3 shows an example of a suitable computing system environment 300 for implementing embodiments of the present subject matter. FIG. 3 and the following discussion are intended to provide a brief, general description of a suitable computing environment in which certain embodiments of the inventive concepts contained herein may be implemented.

A general computing device, in the form of a computer 310, may include a processor 302, memory 304, removable storage 301, and non-removable storage 314. Computer 310 additionally includes a bus 305 and a network interface 312.

Computer 310 may include or have access to a computing environment that includes one or more user input devices 316, one or more output devices 318, and one or more communication connections 320 such as a network interface card or a USB connection. The one or more output devices 318 can be a display device of computer, computer monitor, TV screen, plasma display, LCD display, display on a digitizer, display on an electronic tablet, and the like. The computer 310 may operate in a networked environment using the communication connection 320 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 304 may include volatile memory 306 and non-volatile memory 308. A variety of computer-readable media may be stored in and accessed from the memory elements of computer 310, such as volatile memory 306 and non-volatile memory 308, removable storage 301 and non-removable storage 314. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 302 of the computer 310. For example, a program module 325 may include machine-readable instructions capable of hot deploying/redeploying data in a grid computing environment according to the teachings and herein described embodiments of the present subject matter. In one embodiment, the program module 325 may be included on a CD-ROM and loaded from the CD-ROM to a hard drive in non-volatile memory 308. The machine-readable instructions cause the computer 310 to encode according to the various embodiments of the present subject matter.

The operation of the computer system 300 for recompiling hot deploying/redeploying data in a grid computing environment is explained in more detail with reference to FIGS. 1 and 2.

The above-described technique allows the distributed applications with diverse application containers in a grid environment to be hot deployed and/or redeployed without having to temporarily suspend and/or reinitialize to reduce overhead on the grid system.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-3 are merely representational and are not drawn to scale. Certain proportions thereof may be exaggerated, while others may be minimized. FIGS. 1-3 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus, the following claims are hereby incorporated into the detailed description of the embodiments of the invention, with each claim standing on its own as a separate preferred embodiment.

The invention claimed is:

1. A method for hot deployment and/or redeployment in grid computing environment, wherein the grid computing environment includes one or more grid nodes, comprising:
    adding a new version of an application release bundle in a repository server;
    determining by a discovery services module which of the one or more grid nodes are running an application associated with the added new version of the application release bundle upon adding the new version of the application release bundle in the repository server;
    notifying a client application manager associated with one or more of the determined grid nodes about adding the new version of the application release bundle along with a type of data transfer protocol to use; and
    hot deploying/redeploying the new version of the application release bundle on running one or more application servers in an associated grid node using an appropriate hot deployment plug-in based on the data transfer protocol by a respective one of the client application managers.

2. The method of claim 1, wherein hot deploying/redeploying the new version of the application release bundle on the running one or more application servers in the associated grid using the appropriate hot deployment plug-in based on the data transfer protocol by the respective client application manager, comprises:
    selecting and invoking an appropriate hot deployment plug-in by a respective one of the client application managers based on the data transfer protocol to use for hot deploying/redeploying the new version of the application release bundle in an associated grid node; and
    hot deploying/redeploying the new version of the application release bundle on running one or more application servers using the appropriate hot deployment plug-in in the associated grid node by the respective client application manager.

3. The method of claim 1, wherein hot deploying/redeploying the new version of the application release bundle on running one or more application servers using the appropriate hot deployment plug-in by the respective client application manager comprises:
    hot deploying/redeploying the new version of the application release bundle on running one or more application servers using the appropriate hot deployment plug-in by a data transfer client associated with a respective one of the client application managers.

4. The method of claim 1, wherein the application comprises a set of components that are hosted by one or more application servers in the one or more grid nodes.

5. The method of claim 1, wherein the repository sewer stores one or more new versions of the application release bundle associated with the application.

6. The method of claim 1, further comprising:
    registering the client application manager associated with one or more of the determined grid nodes with the repository server for accepting notification of receipt of the new version of the application release bundle.

7. The method of claim 1, wherein the data transfer plug-in includes protocols selected from the group consisting of ftp, http, gridftp, tcp, and udp.

8. The method of claim 1, wherein each grid node comprises one or more application servers that include components selected from the group consisting of Web containers, Web service containers, and EJB containers.

9. A computer-readable medium with program code embodied therein for causing when executed, a computer system, to perform
    a method for hot deployment/redeployment in a grid computing environment comprising:
    adding a new version of an application release bundle in a repository server;
    determining by a discovery services module which of the one or more grid nodes are running an application associated with the added new version of the application release bundle upon adding the new version of the application release bundle in the repository server;
    notifying a client application manager associated with one or more of the determined grid nodes about adding the new version of the application release bundle along with a type of data transfer protocol to use; and
    hot deploying/redeploying the new version of the application release bundle on running one or more application servers in an associated grid node using an appropriate hot deployment plug-in based on the data transfer protocol by a respective one of the client application managers.

10. The computer-readable medium of claim 9, wherein hot deploying/redeploying the new version of the application release bundle on the running one or more application servers in the associated grid using the appropriate hot deployment plug-in based on the data transfer protocol by the respective client application manager, comprises:
    selecting and invoking an appropriate hot deployment plug-in by a respective one of the client application managers based on the data transfer protocol to use for hot deploying/redeploying the new version of the application release bundle in an associated grid node; and
    hot deploying/redeploying the new version of the application release bundle on running one or more application servers using the appropriate hot deployment plug-in in the associated grid node by the respective client application manager.

11. The computer-readable medium of claim 9, wherein hot deploying/redeploying the new version of the application release bundle on running one or more application servers using the appropriate hot deployment plug-in by the respective client application manager comprises:

hot deploying/redeploying the new version of the application release bundle on running one or more application servers using the appropriate hot deployment plug-in by a data transfer client associated with a respective one of the client application managers.

12. The computer-readable medium of claim 9, wherein the method further comprises:

registering the client application manager associated with one or more of the determined grid nodes with the repository server for accepting notification of receipt of the new version of the application release bundle.

13. The computer-readable medium of claim 9, wherein the data transfer plug-in includes protocols selected from the group consisting of ftp, http, gridftp, tcp, and udp.

14. A computer system comprising:

a processing unit; and a memory coupled to the processing unit, the memory having stored therein code for causing, when executed, the processing unit to perform a method comprising:

adding a new version of an application release bundle in a repository server;

determining by a discovery services module which of the one or more grid nodes are running an application associated with the added new version of the application release bundle upon adding the new version of the application release bundle in the repository server;

notifying a client application manager associated with one or more of the determined grid nodes about adding the new version of the application release bundle along with a type of data transfer protocol to use; and hot deploying/redeploying the new version of the application release bundle on running one or more application servers in an associated grid node using an appropriate hot deployment plug-in based on the data transfer protocol by a respective one of the client application managers.

15. The system of claim 14, wherein hot deploying/redeploying the new version of the application release bundle on the running one or more application servers in the associated grid using the appropriate hot deployment plug-in based on the data transfer protocol by the respective client application manager, comprises:

selecting and invoking an appropriate hot deployment plug-in by a respective one of the client application managers based on the data transfer protocol to use for hot deploying/redeploying the new version of the application release bundle in an associated grid node; and hot deploying/redeploying the new version of the application release bundle on running one or more application servers using the appropriate hot deployment plug-in in the associated grid node by the respective client application manager.

16. The system of claim 14, wherein hot deploying/redeploying the new version of the application release bundle on running one or more application servers using the appropriate hot deployment plug-in by the respective client application manager comprises:

hot deploying/redeploying the new version of the application release bundle on running one or more application servers using the appropriate hot deployment plug-in by a data transfer client associated with a respective one of the client application managers.

17. The system of claim 14, wherein the method further comprises:

registering the client application manager associated with one or more of the determined grid nodes with the repository server for accepting notification of receipt of the new version of the application release bundle.

18. The system of claim 14, wherein the application comprises a set of components that are hosted by one or more application servers in the one or more grid nodes.

* * * * *